July 28, 1931. E. W. BROWN 1,816,631
TOP ENTRANCE BEEHIVE
Filed March 21, 1927 3 Sheets-Sheet 2
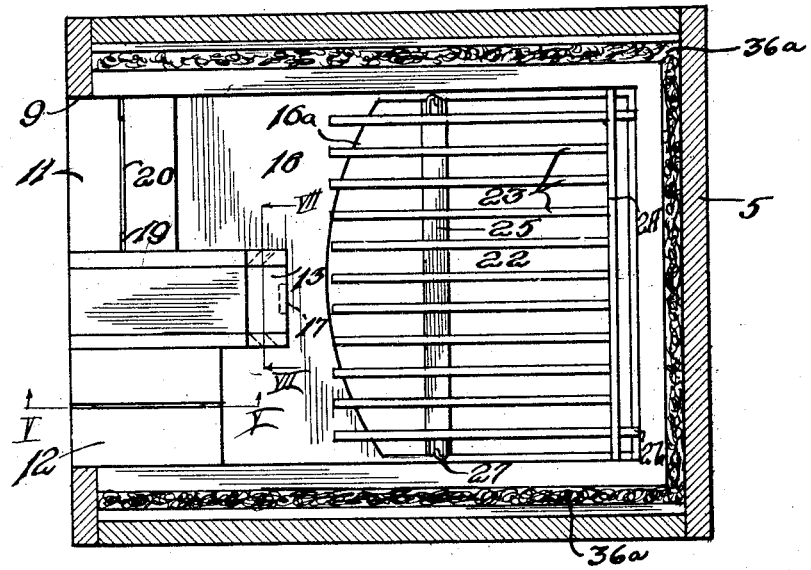
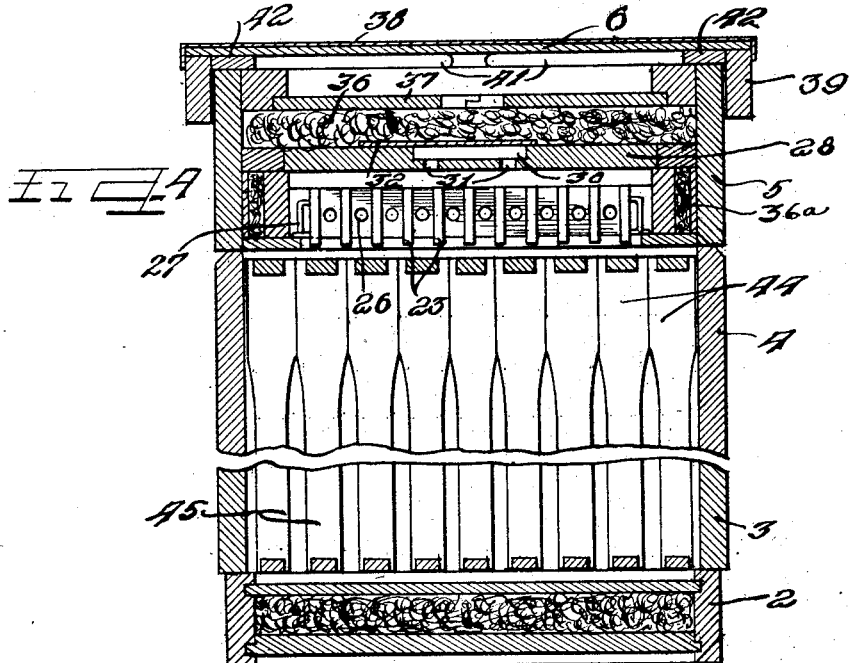
Inventor
Earl Wright Brown

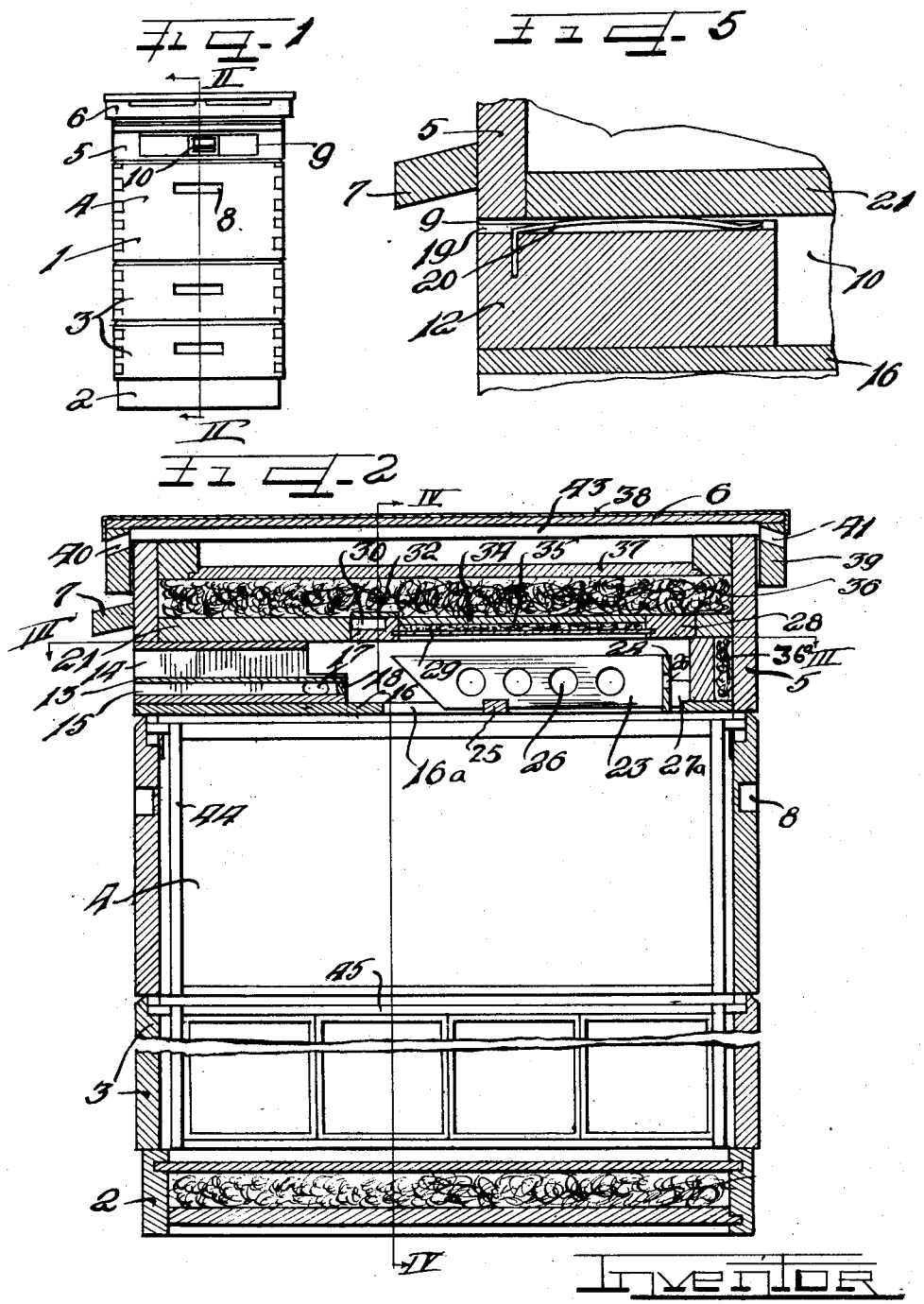

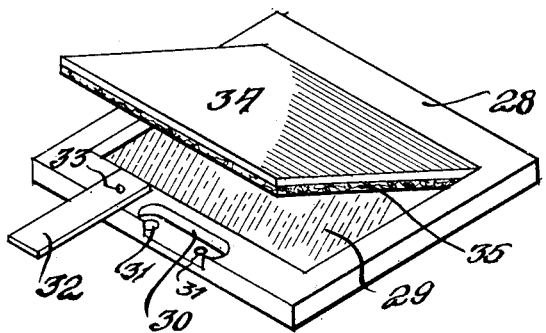

Patented July 28, 1931

1,816,631

UNITED STATES PATENT OFFICE

EARL WRIGHT BROWN, OF WILLOW SPRINGS, ILLINOIS

TOP-ENTRANCE BEEHIVE

Application filed March 21, 1927. Serial No. 176,897.

This invention relates to improvements in beehives and the like, and more particularly to a beehive that has its entrance above the brood nest, which is better ventilated, which permits the bees to work in a direct and more natural manner, which keeps the bees contented and eliminates to a great extent any desire of the bees to swarm, and which is warmer in winter.

It is commonly known that bees are attracted by warmth and fresh air and that they require their brood adjacent the hive entrance. Beekeepers heretofore have ordinarily located the hive entrance at the bottom of the brood chamber. This bottom entrance has been a contributing cause of heavy losses in the wintering of bees, in that the winter cold presses up under the clustering bees forcing them to the top of the hive where, if the hive cover is sealed, and dead bees and ice clog the entrance, the bees are imperilled by their own exhalations which always rise to the top of the hive; if the hive cover is not sealed then the bees are exposed to a draft. It is the law in bee economy that the brood nest shall be substantially near the hive entrance and, as the warmth in the upper part of a hive favors brood rearing, the two great brood attractions—adjacency to the entrance and warmth of the hive—are at extreme points and in opposition if the entrance is at the bottom, whereas with a top entrance of proper construction these two brood attractions are in cooperation.

In hives as heretofore constructed no provision has been made for a substantially high clustering chamber undesirable for comb-building, above the brood chamber and with an entrance thereto, for the purpose of substantially relieving congested conditions when the hive is overcrowded and for enabling the bees, by substantial mass formation, to resist the most intense winter cold.

With these objections in view, it is an object of this invention to provide a beehive having a top entrance and a closed bottom, and which is adapted for the insertion of supers, of any kind or depth, below the brood.

Another object of this invention is to provide a top entrance beehive which is naturally and sufficiently ventilated, eliminating the necessity of fanning by the bees in winter and the loss of energy resulting therefrom.

Another object of the present invention is to provide a beehive having the major attractions, fresh air and warmth, appearing at one part of the hive, namely the top thereof.

Another object of this invention is to provide a beehive which has an adjustable top entrance for regulating ventilation, and which is equally adaptable for both summer and winter use.

Another object of this invention is to provide a beehive so adapted that the bees may work therein contentedly in a truly natural manner and environment, eliminating any undue tendency or desire on the part of the bees to swarm.

It is another object of this invention to provide a beehive having a plurality of clustering chambers undesirable for comb-building and selectively interconnectable disposed above the brood chamber.

Still another object of this invention is to provide a beehive having a top entrance passage so baffled that cold air cannot descend directly into the hive, thereby eliminating the possibility of the bees leaving a useful part of the hive vacant.

A further object of this invention is to provide a beehive from which the honey may be removed as late in the season as desired without curtailing fall breeding.

A still further object of this invention is to provide a beehive so adapted that if neglected in cold weather the brood and bees therein will be in the warmest and best ventilated part of the hive.

Still a further object of this invention is to provide an improved top entrance section for use on beehives, new or already in use.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevational view of a beehive embodying features of this invention.

Figure 2 is a vertical sectional view taken substantially along line II—II of Figure 1.

Figure 3 is a sectional plan view of the beehive taken substantially along line III—III of Figure 2.

Figure 4 is a vertical sectional view of the hive taken substantially along line IV—IV of Figure 2.

Figure 5 is a fragmentary sectional view in elevation taken substantially along line V—V of Figure 3.

Figure 6 is a perspective view of a portion of the top section taken substantially along line III—III of Figure 2.

Figure 7 is a fragmentary sectional view in elevation taken substantially along line VII—VII of Figure 3.

Figure 8 is a fragmentary vertical section, looking towards the front, of a modified form of a beehive embodying principles of this invention.

Figure 9 is a fragmentary vertical sectional view taken substantially along line IX—IX of Figure 8.

As shown on the drawings:

The reference numeral 1 indicates a beehive, embodying features of the present invention, comprising a bottom 2, the usual surplus honey supers 3 removably mounted thereon, a hive body 4 removably stacked on the supers 3, a top section or member 5 removably stacked on the body 4, and a roof or cover 6 which is removably and telescopically associated with the top section 5. Obviously additional supers, of any kind and depth, may be inserted between the hive body 4, which houses the brood, and the bottom 2 as needed, and obviously such a top section may be incorporated with beehives already in use. Slots 8 are provided in the sides of the various parts of the beehive wherever needed to aid in the handling thereof.

In a substantially wide and rather high longitudinal entrance opening 9 over which is the usual water shed 7, in the top section 5 is removably mounted a narrow longitudinal member 10 extending inwardly until substantially adjacent the central portion of the hive, and which provides a combined entrance and ventilating means for the hive, this member being desirable for winter use. To close the remainder of the opening 9 blocks 11 and 12, which are hereinafter described, are removably mounted adjacent the entrance member 10 on either side thereof. This entrance member 10 is divided by the transverse strip 13 into two passageways 14 and 15, the lower passageway 15 being of less height than the upper and extending inwardly beyond the upper passageway 14, as shown in Figures 2 and 3. In winter when the bees are quietly clustered the warm air polluted with animal vapors, rises and automatically passes out of the upper passage 14 in the entrance member 10 creating a partial vacuum in the hive which obviously draws the cold air in through the lower passage 15. Due to the length of the passage 15 the cold air will be somewhat warmed before it descends into the body of the hive, the partial bottom 16 of the top section 5 further acting as a baffle wall to the cold air, so that the incoming air descends substantially in the middle portion of the hive. The bees will, therefore, utilize all the space in the body 4, which they would not do if the cold air descended directly inside the front hive wall. In order that the ventilation may be by convection and to eliminate the possibility of a pronounced draft the passageway 15 is provided with openings 17 in its side walls and a block 18 in its center adjacent its rear end, whereby the incoming air is diffused in several different directions. It is therefore apparent that altho the hive is adequately ventilated, the baffled entrance and closed bottom prevent excessive convection and aid in retention of colony heat.

The blocks 11 and 12 are preferably provided with median longitudinal slots 19 with upwardly arched springs 20 therein which resiliently and frictionally engage a fixed partition 21 in the top section 5. As shown block 11 is sidewise and block 12 endwise in the opening 9. As the weather conditions vary the blocks 11 and 12 may be inserted lengthwise or endwise or removed altogether, as required according to bee behavior. Obviously, a partition (not shown in the drawings) may be slid into the opening 9 to provide two passages similar to 14 and 15 if so desired. Adequate ventilation of the hive by convection continues through these adjustments of the entrance, only the baffle 16 being necessary in warm weather. Due to this novel means for ventilating the hive the queen bee will keep her brood in the body 4, where the air is freshest and the hive warmest, and ordinarily will not descend into the supers for breeding purposes.

The walls and partial bottom 16 of the top section 5 and the partition 21 define a cluster chamber and over the large opening 16a in the floor of the chamber is a cluster rack 22 formed of a plurality of longitudinal slats 23 obliquely cut at their outer ends and secured together by an upright transverse slat 24 and a bottom slat 25, or by similar means, the slats 23 and the slat 24 being provided with numerous perforations 26. The rack 22 is supported in any desired manner, or, as shown, by cleats 27 and 27a. This rack provides a clustering place for the bees and due to its structure effectively prevents comb-building therein. The dimensions, shape, and general construction of the cluster rack may be rather widely varied, but it is preferable to have the slats relatively thin and close together and the apertures of about a bee's length in diameter. Obviously at times of the year unseasonable for comb-building, the cluster rack may successfully be removed.

Removably mounted in any desired manner in the horizontal partition 21 in Figures 2, 5 and 7 substantially above the cluster rack 22 is a sash 28 encasing an observation window 29, which is below the center line of the sash 28 for a purpose hereinafter described. A recess 30 having apertures or bee passages 31 adjacent each end thereof and adapted to receive the usual bee-escape therein is provided in one side of the sash 28. This recess 30 is selectively closed by a trap cover 32 pivoted at 33.

Removably disposed in the sash 28 over the window 29 is a cover 34 having on its underside a strip 35 of felt or similar material to aid in keeping the hive warm in cold weather. Over the top of the partition 21 and cover 34 a pad 36 of cow-hair felt or similar material is laid, being held in place by a removable inner cover 37. The walls of the top section 5 are hollow and also contain padding as shown at 36a. This padding 36 and 36a and the thickness of the blocks 11 and 12 effectively prevent the side walls of the top section 5 from reaching the dew point and eliminate the injurious condensation of animal vapors on the interior thereof.

The roof 6 is preferably covered by a strip of sheet metal 38. This roof 6 is constructed with a depending flange 39 therearound which telescopically engages the top section 5. The front and rear sides of the flange are preferably provided with oblique ventilation slots 40 and 41. When the roof 6 is placed over the top section 5 strips or blocks 42 retain it in an elevated position thereby providing an air space 43 in Figure 2 in conjunction with the slots 40 and 41 permitting a free circulation of air underneath the roof 6.

In summer weather, and especially in rainy weather when the bees cannot work and continue to multiply but do not die off proportionally, and there is a necessity for extra room in the hive, the pad 36 and inner cover 37 are removed, and the cover 32 is opened, or if desired the sash 28 is removed, thereby providing a well ventilated auxiliary cluster chamber or loafing room underneath the roof 6, and greatly reduces any tendency of the bees to swarm due to overcrowded conditions.

As shown in Figures 2 and 4 the hive body is provided with the usual brood frames 44, and the supers 3 with comb honey frames 45.

The bottom 2 is preferably, but not necessarily, provided with insulating material as shown. It is to be noted that the bottom 2 is entirely closed on all four sides for the normal usage of the hive.

Figures 8 and 9 show a beehive, embodying features of this invention and differing from the hive disclosed in Figures 1 to 7 inclusive as set forth hereinafter. This is a horizontally long hive for use where the apiarist does no supering. A top member 5a is used in this form of hive having the entrance passageway 9 therein, preferably, but not necessarily, in the center thereof.

The roof 6 in this form of the hive has a depending flange 52 therearound which extends downwardly past the hive entrance 9 to rest on cleats 52a and is provided with an opening 53 adjacent the entrance 9. In the floor of the entrance passageway 9 suitable openings such as the longitudinal slots 54 are provided to connect the entrance with the hive body 4. A number of apertures 55 adapted to communicate with the chamber above, after the winter packing is removed are provided in the ceiling of the entrance 9 and are selectively covered by covers 56 similar to the cover 32 of Figures 2, 4 and 6. Packing material 36 and inner cover 37 are held in place directly by the flanges 52 on the roof 6, and, of course, may be removed to provide a loafing-room underneath the roof as hereinbefore described. Ventilation is provided underneath the roof 6 by means of air space 43 to which air is admitted through openings 57 on each side of the hive underneath the integral depending flange 58 on the sheet metal covering 38 of the roof 6.

Although not shown in Figures 8 and 9 blocks 11 and 12 and the entrance member 10 may be employed in this form of hive for the same purpose and with the same result, in substantially the same way as hereinbefore described for the hives shown in Figures 1 to 7 inclusive.

In the hive body 4 brood combs 44 are placed substantially below the entrance passageway 9 and the frames 59 of any suitable kind or depth for the surplus honey are disposed adjacent the brood frames on either side thereof. Separating the brood frames 44 from the surplus honey frames 59 are two frames 60 which do not have the usual spacing device thereon, thus making it easier to remove any or all frames from the body 4. In cold weather when the surplus honey frames are not in use partitions may be substituted for the frames 60 thereby leaving only a central brooding compartment in the hive.

From the foregoing it is apparent that I have provided a beehive having a top entrance from which the cold air coming therethrough is prevented by baffle means from directly entering the brood nest in which the bees can cluster in mass formation to resist intense cold, in which the supers are placed below the brood nest and may be placed in the hive long before they will be occupied, and left therein long after they are filled without interfering with ventilation of the hive or disturbing the bees in any manner whatever, and without lessening the necessary warmth of the hive. Moreover, the beehive disclosed in this invention lessens to a great extent the necessity of ventilative fanning by the bees in winter to remove the foul air, provides a more natural environment in which the bees may work in a truly natural manner, which prevents any undue tendency on the part of the bees to swarm therefrom, and which is easily assembled and operated and may be readily and cheaply manufactured.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In a beehive, an upper section having a longitudinal entrance opening therein, and blocks resiliently and frictionally engaged in said opening.

2. In a beehive, an upper section having an entrance opening therein, and a combined entrance and ventilating member in said opening, said member being transversely divided into two passageways.

3. In a beehive, an upper section having an entrance opening therein, removable blocks closing the major part of said opening, and a combined entrance and ventilating member in the remainder of said opening, said member having two passageways therethrough, the lower of said passageways extending inwardly beyond the upper passageway.

4. A beehive comprising a closed bottom, supers removably stacked thereon, a hive body removably mounted on said supers, an upper section having a transversely divided entrance therein removably mounted on said body, and a roof on said upper section.

5. In a beehive, a section having an entrance opening therein, spaced partitions in said section defining a passageway adjacent said opening, a longitudinal member having a plurality of passages therethrough in said passageway adjacent said opening, and blocks in said passageway to close the remainder of said opening.

6. In a beehive, a top section having a longitudinal entrance opening therein, removable and adjustable blocks closing the greater part of said opening, a unitary entrance and ventilating member removably mounted in the remainder of said opening, said member having longitudinal passageways therethrough, the lower of said passageways extending inwardly beyond the upper passageway, and having perforations in its sidewalls, and means in said lower passageway to divide said passageway into a plurality of passageways adjacent the inner end thereof.

7. In a beehive, a hive body, a top section having an entrance passageway therein mounted on said body, a partial floor in said top section leaving an opening therein communicating with said body, and a cluster rack disposed over said opening.

8. A beehive comprising a hive body, a top section having an entrance passageway therein removably mounted on said body, a roof removably mounted on said top section, a partial floor in said top section leaving an opening therein communicating with said body, a slatted cluster rack removably mounted over said opening, and a partition having bee passages therethrough in said top section and defining a chamber thereabove.

9. In a beehive, a hive body, a top section on said body, said top section having an adjustable entrance thereto, a cluster rack formed of a plurality of slats in said top section, said slats having numerous apertures therethrough.

10. In a beehive, an upper section having an inwardly extending entrance opening and a substantially high clustering chamber undesirable for comb-building, said section having an opening in the bottom thereof to establish communication between said cluster chamber and the brood chamber of said hive, and means supported by said upper section for providing an auxiliary cluster chamber, said section having an opening through which communication may be selectively established between said first cluster chamber and said auxiliary cluster chamber.

11. In a beehive, an upper section having an inwardly extending entrance passage, a partial bottom in said section forming a cluster chamber to overlie the brood chamber of said hive with which the bottomless portion of said cluster chamber communicates, and a removable cluster rack for disposition over said bottomless portion in the season of need.

12. The combination with a beehive of an upper section therefor having the only hive entrance passageway therein, means in said section forming a cold air baffle, and means for varying the depth and area of said passageway.

13. As an article of manufacture, an upper section for a beehive, said section having an entrance passageway for said hive therein, a transverse partition in said section dividing the same into an upper and a lower cluster chamber, the lower of said chambers communicating with the lower sections of said hive, said partition having an opening therein to establish communication between both cluster chambers, and means for selectively closing said opening.

14. As an article of manufacture an upper section for a beehive, said section containing a pair of superposed cluster chambers and an opening to establish communication therebetween, means for selectively closing said opening, said section having an entrance passageway for said hive leading into the lower of said chambers, there being an opening in the floor of said lower chamber for communication with the lower part of said hive, and means for varying the size of said entrance passageway, whereby said upper section may be adjusted to render said hive suitable in all climatic conditions.

15. In a beehive, a closed bottom, closed hive sections thereon, an upper section having a closed top and disposed on the uppermost of said hive sections, said upper section having therein the only entrance means for said hive, baffle means adjacent said entrance and extending inwardly a sufficient distance to preclude the descent of incoming air before the same reaches substantially the middle of said section, the outgoing air passing out of said entrance means over said incoming air, whereby said hive is self-ventilated without undue draft.

16. In combination with a beehive, an upper section having the only entrance to said hive therein, said section having a cluster chamber therein communicating with lower portions of said hive, a ventilated roof on said section providing a second chamber above said first said chamber, there being an opening in the ceiling of said first said chamber to establish communication with said second chamber.

17. In a beehive, a section for disposition over a closed bottom lower section and having the hive entrance therein, a cluster rack in the upper section to provide a resting place for bees near said entrance.

18. In a beehive, an upper section for disposition above the brood section and having the hive entrance opening therein, a cluster chamber in said upper section communicating with said entrance opening and with said brood section, means in said cluster chamber for rendering the space therein unavailable for comb building.

19. A structure as specified in claim 18 in combination with means for adjusting the area and the depth of said entrance opening.

20. As an article of manufacture, an entrance section for a closed bottom hive comprising a cluster chamber open on one side and adapted for disposition over the brood nest of said closed bottom hive, a floor in said cluster chamber with suitable opening therein to establish communication therethrough, removable means in said cluster chamber to prevent the building of comb therein, and means for regulating the area and the depth of the opening in said open side of said cluster chamber.

21. A structure as specified in claim 20 in combination with an upper chamber positioned above said cluster chamber, suitable opening (selectively closed) through the top of said cluster chamber whereby communication is established between said cluster chamber and said upper chamber, and a removable top on said upper chamber.

22. A closed bottom beehive having a plurality of inwardly extending openings above the brood nest in said closed bottom hive, a partial floor under said openings and above said brood nest forming an air baffle extending inwardly to substantially the central region of the hive above the brood nest, whereby the inside of the said closed bottom hive has a plurality of communications with the outside without having a draft through the hive.

23. A beehive having a cluster chamber therein disposed above the brood chamber, said cluster chamber having a hive entrance leading thereinto, a cluster rack in said cluster chamber to prevent the building of comb therein.

24. As an article of manufacture, an upper section for disposition over the brood chamber of a beehive and having the hive entrance therein, said upper section containing a cluster chamber, and means in said cluster chamber to prevent comb-building therein.

In testimony whereof I have hereunto subscribed my name.

EARL WRIGHT BROWN.